June 10, 1947.  T. E. MEAD  2,421,957

WORK HOLDING APPARATUS

Filed Jan. 24, 1944  2 Sheets-Sheet 1

Inventor:
Theodore E. Mead,
By Dawson, Ooms & Booth,
Attorneys.

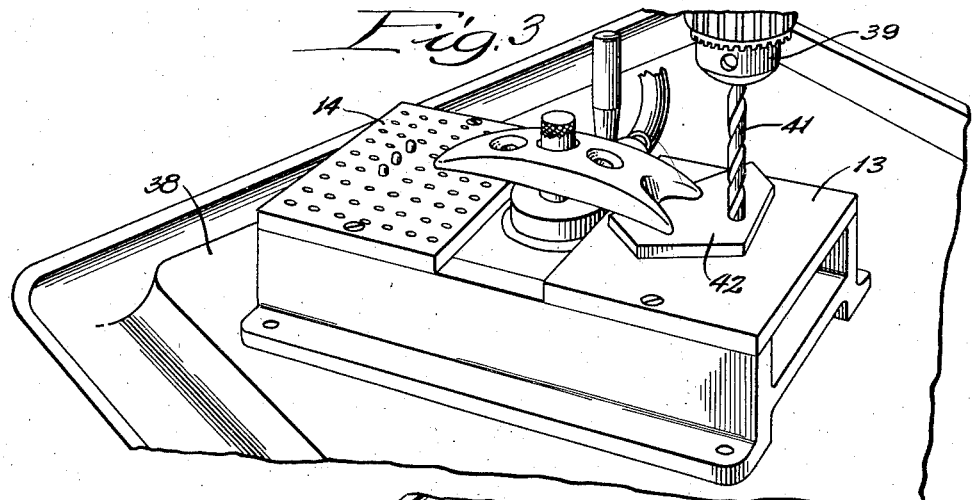
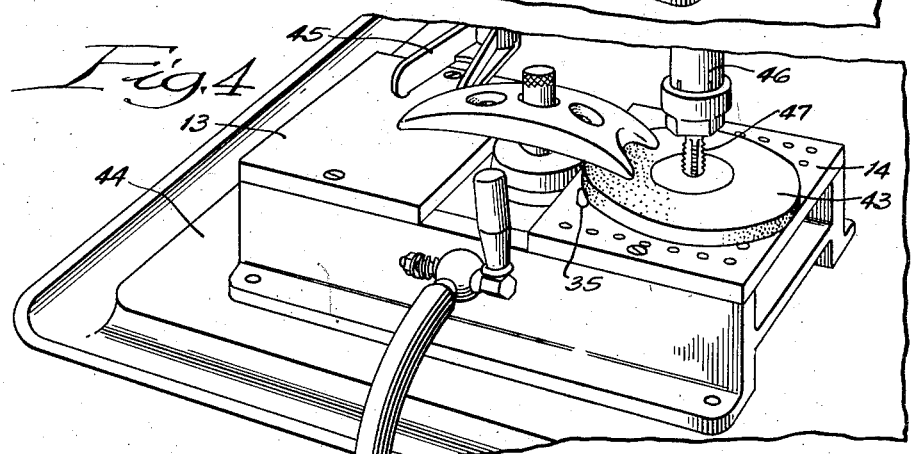
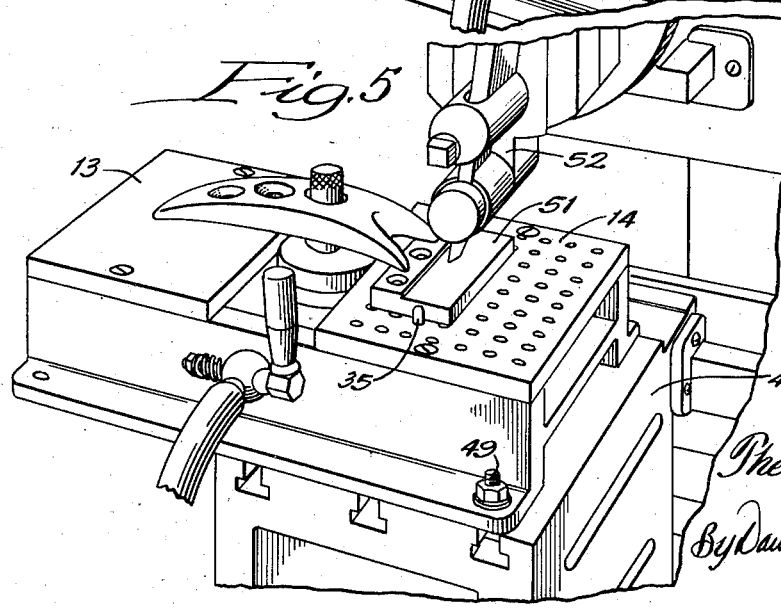

Patented June 10, 1947

2,421,957

UNITED STATES PATENT OFFICE 2,421,957

WORK HOLDING APPARATUS

Theodore E. Mead, Wilmette, Ill., assignor to Mead Specialties Company, Inc., a corporation of Illinois Application January 24, 1944, Serial No. 519,457

1 Claim. (Cl. 90—59)

This invention relates to work holding apparatus and more particularly to apparatus for releasably clamping a work piece during a machining operation.

One of the objects of the invention is to provide work holding apparatus which will firmly clamp a work piece with one side parallel to a machine table regardless of variations in the thickness or irregularity of outline of the work piece.

Another object of the invention is to provide work holding apparatus which is operated by fluid pressure to hold a work piece.

Still another object of the invention is to provide work holding apparatus in which supporting plates for holding the work may be easily replaced in the event that they are damaged during machining operations.

A still further object of the invention is to provide work holding apparatus in which a work piece is accurately located and is held so located during a machining operation.

The above and other objects and advantages will be more readily apparent from the following description when read in connection with the accompanying drawing, in which—

Figures 3, 4 and 5 are partial perspective views illustrating several machining operations.

Figure 1:
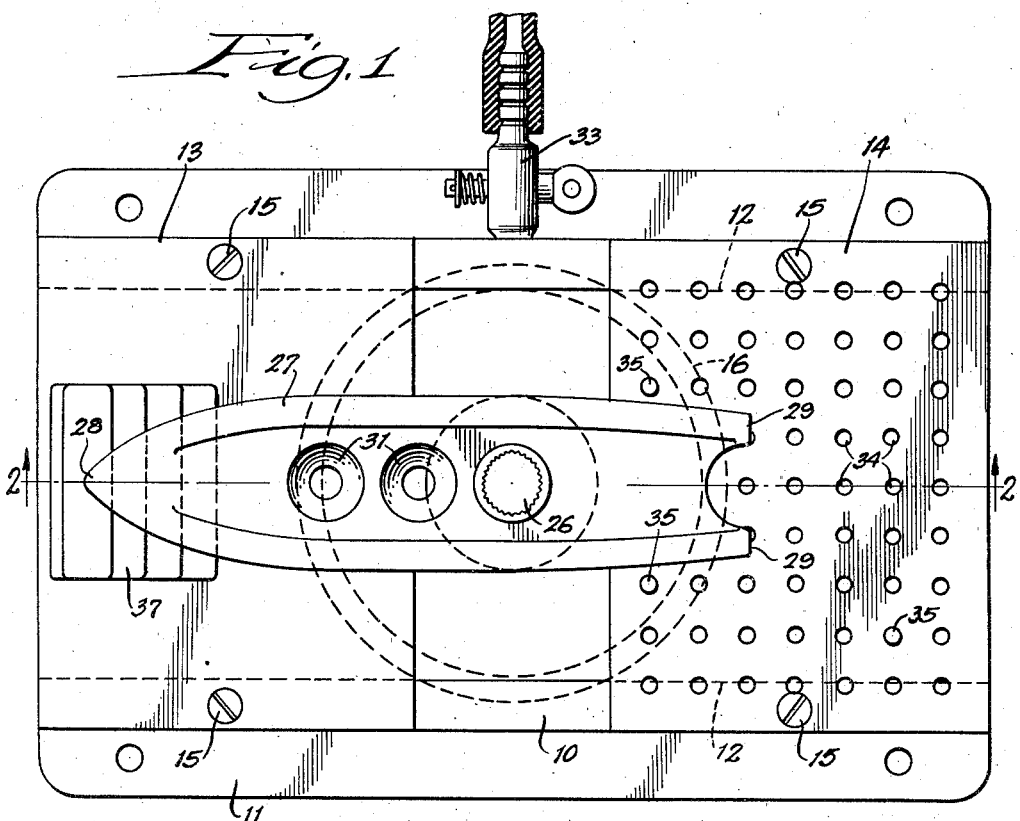
Figure 1 is a top plan view of work holding apparatus embodying the invention.

The apparatus as shown comprises a base 10 which may be a casting or the like and which may rest loosely on the work table of a machine or may be fastened thereto by bolts passing through flanges 11 on the base. At its upper side the base is formed with a pair of parallel rails 12 extending along its opposite sides and adapted to support plates 13 and 14. The plates 13 and 14 are detachably connected to the end portions of the base by screws 15 so that they may be easily removed for replacement in the event that they are damaged.

The base is formed in its central portion with a vertical cylinder 16 in which a piston 17 slidably fits. The piston 17 is made up of top and bottom plates 18 and 19 supporting a packing 21 between them and connected by a piston rod 22 extending centrally through the plates 18 and 19. The piston rod 22 is sealed in the cylinder by a packing 23 and extends upwardly through the space between the plates 13 and 14. Springs 24 are provided urging the piston in an upward direction.

The piston rod 22 has adjustably threaded therein a clamping rod 25 which extends above the base and terminates in a head 26 whose lower surface is shaped as a part of a sphere. The clamping rod 25 passes through any one of several openings in a clamping bar 27 which is formed at one end with a narrow clamping portion 28 and at its opposite end is forked to provide laterally spaced clamping portions 29. The clamping portions are so arranged that a triangle drawn around them will circumscribe the central openings in the bar through which the clamping rod 25 extends. As shown three such openings are provided terminating at their ends in partispherical sockets 31 into which the head 26 of the rod may fit. This construction permits angular movement between the clamping bar and the rod. Preferably a spring 32 is provided acting between the piston rod 22 and the bar 27 to urge the bar upwardly against the head 26. The apparatus is operated by fluid pressure supplied to the cylinder 16 through a valved connection 33. When fluid is admitted to the cylinder above the piston the piston will be moved downwardly to tension the clamping rod and urge the clamping bar toward the base.

Figure 2:
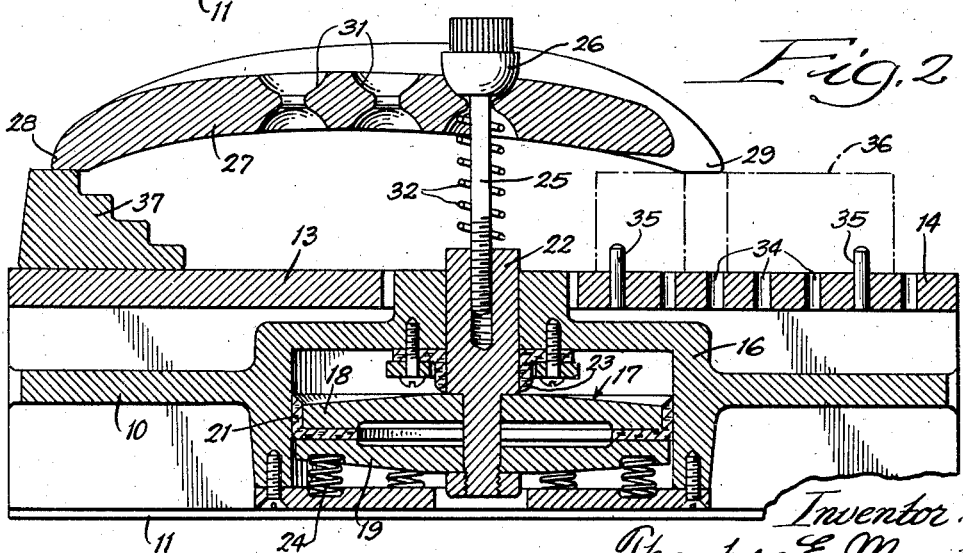
Figure 2 is a section on the line 2—2 of Figure 1.

In order accurately to locate a work piece on the base, the plate 14 is formed with a series of openings 34 adapted to receive stop pins 35. By properly placing such stop pins in the opening a work piece such as indicated at 36 in Figure 2 may be accurately located on the base. Such pins may further assist in holding the work piece against sliding on the base during machining operation.

In use a work piece may be placed on either of the plates 13 or 14 and may be engaged by either end of the clamping bar according to the particular operation to be performed. Regardless of variations in the contour of the work piece, the bar will accommodate itself by turning angularly about the head 26 due to the fact that the clamping portions 28 and 29 form a three part support. Variations in the thickness of the work piece may be accommodated by adjusting the connection of the clamping rod 25 to the piston rod 22 and by utilizing proper spacers between the end of the bar which does not engage the work piece and its underlying supporting plate. One such spacer as shown is desirably formed as a stepped block 37 so that the end of the bar may rest on any one of the several steps to vary its spacing above the plate. The point of clamping the work piece by the bar may be adjusted by shifting the clamping rod from one to the other of the several openings in the bar so that work pieces of various sizes may be easily accommodated. The spring 32 insures that when the piston is raised by its springs 24 the clamping bar will be lifted above the work piece so that it may easily be removed.

Use of the work holding apparatus of the present invention in a drilling operation is illustrated in Figure 3. For this purpose the base may rest loosely on the work table of the drill shown at 38, the base having sufficient weight to prevent movement if the drill should snag so that clamping is unnecessary. The drill spindle is indicated at 39 carrying a drill 41 which may be moved down toward the work.

The piece to be drilled as shown at 42 may be a relatively flat plate of irregular outline which would be extremely difficult to hold in a conventional vise. This piece may be placed on the plate 13 and one end of the clamping bar 27 may be placed over the work piece. When fluid pressure is supplied to the cylinder the clamping bar will be moved down to hold the work piece firmly against the table. The work piece may be located by placing it carefully before opening the valve to supply fluid to the cylinder or if its location is not accurate after clamping the entire base may be moved on the table.

In a drilling operation of this kind it is frequently desirable to drill completely through the piece into the supporting plate in order to avoid burrs on the lower side of the work piece. With the present construction in which the plate 13 is a plain plate and can easily be removed from the base, this is a feasible operation since the cost of replacement of the supporting plate is extremely low.

Fig. 4 illustrates a tapping operation on a circular work piece 43. For this operation the base need not be secured to the work table shown at 44 since its weight is sufficient to hold it on the table without clamping. If desired, however, the base may be steadied by a clamp as indicated at 45 secured to the frame of the machine and engaging one of the supporting plates. The machine arbor is shown at 46 carrying a tap 47 which is adapted to tap a central hole in the work piece 43. In this operation the work piece is shown supported on the perforated plate 14 where it may be accurately located by the use of the locating pins 35. It will be understood that the plate 14 is preferably drilled with a clearance opening for the tap in case it is desired to tap the opening completely through the opening in the work piece.

For a tapping operation of this character the base is preferably accurately located on the work table and may be held so located by a clamp or the like as indicated at 45. When the work pieces are placed on the plate 14 they are accurately located thereon by the stop pins 35 so that the drilled openings in the work pieces will register with the tap. The tap may then be moved down to perform the tapping operation. Since the work pieces are firmly and accurately held in the desired position, tapping operations can be performed very rapidly on a series of such work pieces.

Figure 5 illustrates use of the work holding apparatus for a planing or shaping operation. In this type of operation the base is preferably clamped to the work table as shown at 48 by bolts 49. The work piece 51 is preferably supported on the perforated plate 14 and is located accurately thereon by stop pins 35 placed in the appropriate openings in the plate. Preferably one of the locating pins lies at the end of the plate toward which the tool moves in a cutting operation to assist in taking the thrust of the tool. The head of the shaper or planer is shown at 52 and is adapted to reciprocate across the work piece to plane or shape the upper surface thereof. In this work piece as with the work pieces 42 and 43 of Figures 3 and 4, if the work piece has one flat surface it may be placed against the supporting plate and the work piece will be held with the flat surface parallel to the work table. Thus in drilling and tapping the drill or tap always moves at right angles to the flat surface of the work piece and in planing or shaping the cuts are always taken parallel to the flat surface of the work piece. This is true regardless of the shape of the remainder of the work piece and regardless of the contour of its edges since with the present work holding apparatus the work piece is always clamped by pressing it against a flat supporting plate. This apparatus is therefore well adapted to hold pieces which could not be clamped in a vise without special fixtures and regardless of the size or shape of the pieces.

While one embodiment of the invention has been shown and described in detail herein, it is understood that this is illustrative only and is not intended as definition of the scope of the invention, reference being had for this purpose to the appended claim.

I claim:

Work holding apparatus comprising a base having substantially plane end portions, a clamping rod extending upwardly from the central portion of the base, an elongated clamping bar formed intermediate its ends with an opening through which the clamping rod extends and having a parti-spherical socket in its upper side around the opening, a head on the rod having a parti-spherical portion to fit in the socket, the bar having a relatively narrow clamping portion at one end and laterally spaced clamping portions at its other end, the base having a vertical central bore therein, a piston in the bore connected to the rod, a spring urging the bar away from the piston, means to supply fluid to the bore above the piston, and springs urging the piston upward in the bore.

THEODORE E. MEAD.

REFERENCES CITED

The following references are of record in the file of this patent:

UNITED STATES PATENTS

| Number | Name | Date |
|---|---|---|
| 1,128,187 | Raverly | Feb. 9, 1915 |
| 1,200,407 | Arrants | Oct. 3, 1916 |
| 493,178 | McVey | Mar. 7, 1893 |
| 893,754 | Russell | July 21, 1908 |
| 1,676,289 | Schmalz | July 10, 1928 |
| 1,801,222 | Cayo | Apr. 14, 1931 |
| 1,690,541 | Kuzelewski | Nov. 6, 1928 |
| 2,148,563 | Kingsley | Feb. 28, 1939 |
| 1,269,811 | Heritage | June 18, 1918 |
| 1,308,451 | Schachat | July 1, 1919 |
| 2,264,497 | Agan | Dec. 2, 1941 |
| 95,729 | Rockwood | Oct. 12, 1869 |
| 1,479,127 | Cadwallader | Jan. 1, 1924 |
| 1,261,432 | Parslow | Apr. 2, 1918 |
| 1,077,652 | Sutch | Nov. 4, 1913 |